(12) United States Patent
Powell et al.

(10) Patent No.: US 7,014,113 B1
(45) Date of Patent: Mar. 21, 2006

(54) VERSATILE GRAPHICAL CODE READER FOR READING DIFFERENT TYPES OF GRAPHICAL CODES

(75) Inventors: George Powell, Sandy, UT (US); Blake Crowther, Franklin, ID (US); Ryan Hyde, Draper, UT (US); Mark Wenzel, West Valley City, UT (US); Paul J. Hepworth, Riverton, UT (US); Morgan Taylor, Lehi, UT (US)

(73) Assignee: The Code Corporation, Draper, UT (US)

( * ) Notice: Subject to any disclaimer, the term of this patent is extended or adjusted under 35 U.S.C. 154(b) by 0 days.

(21) Appl. No.: 10/643,004

(22) Filed: Aug. 18, 2003

Related U.S. Application Data

(60) Provisional application No. 60/404,796, filed on Aug. 19, 2002.

(51) Int. Cl.
*G06K 7/10* (2006.01)

(52) U.S. Cl. ............................ 235/454; 235/462.25

(58) Field of Classification Search ............ 235/454, 235/462.11, 462.14, 462.23, 462.24, 462.25, 235/462.26, 462.32, 462.41, 472, 435, 440; 250/208.1, 201.2; 359/205, 821, 441, 819
See application file for complete search history.

(56) References Cited

U.S. PATENT DOCUMENTS

| | | | |
|---|---|---|---|
| 4,843,222 A | | 6/1989 | Hochgraf |
| 5,063,441 A | * | 11/1991 | Lipton et al. ................ 348/47 |
| 5,627,366 A | | 5/1997 | Katz |
| 5,646,767 A | * | 7/1997 | Iima et al. ................ 359/206 |
| 5,814,803 A | | 9/1998 | Olmstead et al. |
| 5,821,522 A | * | 10/1998 | Li et al. ................ 235/472.01 |
| 5,914,479 A | * | 6/1999 | Fikes et al. ........... 235/462.32 |
| 6,073,851 A | * | 6/2000 | Olmstead et al. ...... 235/462.45 |
| 6,118,600 A | * | 9/2000 | Chang ...................... 359/821 |
| 6,318,637 B1 | | 11/2001 | Stoner |
| 6,340,114 B1 | * | 1/2002 | Correa et al. ......... 235/462.22 |
| 6,568,594 B1 | * | 5/2003 | Hendriks et al. .......... 235/454 |
| 6,590,688 B1 | * | 7/2003 | Ishihara ................... 359/205 |
| 6,621,063 B1 | * | 9/2003 | McQueen ............... 250/208.1 |
| 6,689,998 B1 | * | 2/2004 | Bremer ................... 250/201.2 |
| 6,771,407 B1 | * | 8/2004 | Hayashi et al. ........... 359/205 |
| 6,824,059 B1 | * | 11/2004 | Jam et al. .............. 235/462.25 |
| 2004/0027451 A1 | * | 2/2004 | Baker ......................... 348/46 |
| 2004/0159703 A1 | * | 8/2004 | Kogan et al. .............. 235/454 |

* cited by examiner

*Primary Examiner*—Thien M. Le
*Assistant Examiner*—Edwyn Labaze
(74) *Attorney, Agent, or Firm*—Madson & Austin

(57) ABSTRACT

A graphical code reader is disclosed. The graphical code reader includes an image sensor. A first lens is provided for focusing light reflected from a graphical code to form a first image on a first region of the image sensor. A second lens is provided for focusing light reflected from the graphical code to form a second image on a second region of the image sensor. The first lens is separated from the image sensor by a first distance, and the second lens is separated from the image sensor by a second distance. The first distance is greater than the second distance. A decoder is also provided for processing image data to obtain information contained in the graphical code.

21 Claims, 10 Drawing Sheets

VERSATILE GRAPHICAL CODE READER FOR READING DIFFERENT TYPES OF GRAPHICAL CODES

RELATED APPLICATIONS

This application is related to and claims priority from U.S. patent application Ser. No. 60/404,796 filed Aug. 19, 2002, for "Versatile Graphical Code Reader With Multiple Optical Paths," with inventors George Powell, Blake Crowther, Ryan Hyde, Mark Wenzel, Paul Hepworth, and Morgan Taylor, which is incorporated herein by reference.

TECHNICAL FIELD

The present invention relates generally to graphical code readers. More specifically, the present invention relates to a versatile graphical code reader for reading different types of graphical codes.

BACKGROUND

A machine-readable graphical code ("graphical code") is a graphical representation of information that consists of multiple graphical code elements having different light reflective or light emissive properties. Examples of different types of graphical codes include bar codes, data matrix codes, MaxiCodes, and so forth. Graphical codes have become widely used in many commercial environments, such as point-of-sale stations in retail stores and supermarkets, inventory and document tracking, and the like.

Devices for identifying or extracting information from graphical codes are generally referred to as graphical code readers. Graphical code readers typically include one or more light sources for illuminating a graphical code. Light is reflected from the graphical code toward the graphical code reader. A lens within the graphical code reader focuses an image of the graphical code onto an image sensor. Pixels within the image sensor are read electronically to provide a two-dimensional array of image data corresponding to the graphical code. A decoder then processes the image data and extracts the information contained in the graphical code.

Different types of graphical codes include different types of graphical code elements. For example, bar codes include variable-width rectangular bars. Data matrix codes include square data modules. MaxiCodes include a central finder pattern and a grid of hexagons surrounding the central finder pattern.

Different types of graphical codes may vary in size. For example, bar codes are typically larger in size than data matrix codes. The graphical code elements within different types of graphical codes may also vary in size. For example, the variable-width rectangular bars in bar codes are typically larger than the square data modules in data matrix codes or the hexagons in MaxiCodes.

One characteristic which affects the performance of graphical code readers is the position of the lens relative to the graphical code and the image sensor. Moving the lens closer to the graphical code and farther away from the image sensor increases the magnification of the graphical code elements on the image sensor, which increases the resolution and decreases the field of view of the image that is formed. Conversely, moving the lens closer to the image sensor and farther away from the graphical code decreases the magnification of the graphical code elements on the image sensor, which decreases the resolution and increases the field of view of the resulting image.

Lens arrangements that are capable of providing high resolution images are optimized for reading graphical codes with relatively small graphical code elements, while lens arrangements that are capable of providing images that have a large field of view are optimized for reading large graphical codes. Sometimes, however, it may be desirable to read both small, high-density graphical codes and large graphical codes. Accordingly, benefits may be realized by a versatile graphical code reader that is capable of reading both large graphical codes and graphical codes with small graphical code elements.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
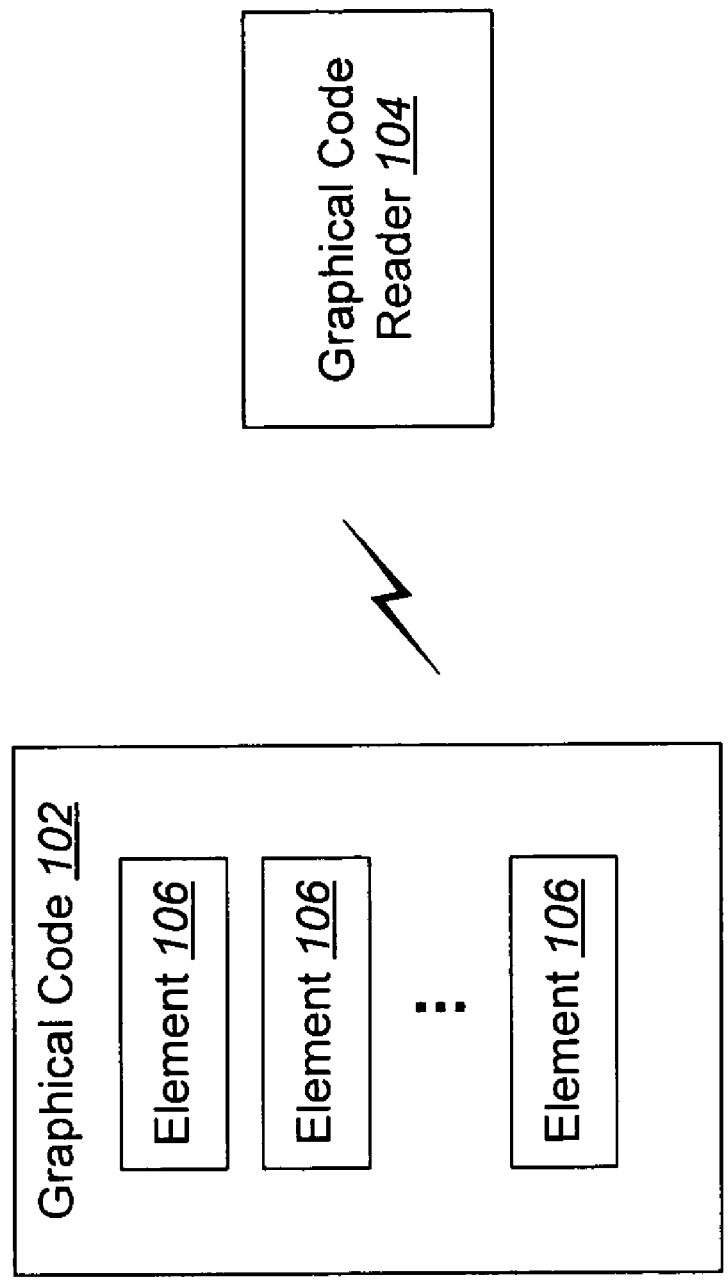
FIG. 1 is a block diagram illustrating a graphical code being read by a graphical code reader.

Various graphical code readers are disclosed. An exemplary embodiment of a graphical code reader includes an image sensor, a first lens and a second lens. The first lens focuses light reflected from a graphical code to form a first image on a first region of the image sensor. The second lens focuses light reflected from the graphical code to form a second image on a second region of the image sensor. The first lens is separated from the first region of the image sensor by a first distance, and the second lens is separated from the second region of the image sensor by a second distance. The first distance is greater than the second distance. The graphical code reader also includes a decoder for processing image data to obtain information contained in the graphical code.

In some embodiments, the first lens may be substantially identical to the second lens. Alternatively, or in addition, the first lens and the second lens may be fixed in position.

The image data may correspond to either the first image or the second image. Alternatively, the image data may correspond to both the first image and the second image. In such embodiments, the decoder may be configured to detect and suppress redundant image data.

A first area between the first lens and the first region of the image sensor may define a first optical path, and a second area between the second lens and the second region of the image sensor may define a second optical path. The graphical code reader may include at least one baffle for preventing light in the first optical path from entering the second optical path and for preventing light in the second optical path from entering the first optical path.

The graphical code reader may include a third lens for focusing light reflected from the graphical code to form a third image on a third region of the image sensor. The third lens may be separated from the third region of the image sensor by a third distance. The third distance may be greater than the second distance but less than the first distance.

Another exemplary embodiment of a graphical code reader includes a first image sensor and a second image sensor. A first lens is provided for focusing light reflected from a graphical code to form a first image on the first image sensor. A second lens is provided for focusing light reflected from the graphical code to form a second image on the second image sensor. The first lens is separated from the first image sensor by a first distance, and the second lens is separated from the second image sensor by a second distance. The first distance is greater than the second distance. The graphical code reader also includes a decoder for processing image data to obtain information contained in the graphical code.

In some embodiments, the first lens is substantially identical to the second lens. Alternatively, or in addition, the first lens and the second lens may be fixed in position.

The image data may correspond to either the first image or the second image. Alternatively, the image data may correspond to both the first image and the second image. In such an embodiment, the decoder may be configured to detect and suppress redundant image data.

A first area between the first lens and the first image sensor may define a first optical path, and a second area between the second lens and the second image sensor may define a second optical path. The graphical code reader may include at least one baffle for preventing light in the first optical path from entering the second optical path and for preventing light in the second optical path from entering the first optical path.

The graphical code reader may include a third image sensor and a third lens for focusing light reflected from the graphical code to form a third image on the third image sensor. The third lens may be separated from the image sensor by a third distance. The third distance may be greater than the second distance but less than the first distance.

Another exemplary embodiment of a graphical code reader includes an image sensor, a first lens, and a second lens. The first lens focuses a first image of a graphical code onto a first region of the image sensor at a first magnification. The first image comprises a first field of view. The second lens focuses a second image of the graphical code onto a second region of the image sensor at a second magnification. The second image comprises a second field of view. The first magnification is greater than the second magnification, and the first field of view is smaller than the second field of view. The graphical code reader includes a decoder for processing image data to obtain information contained in the graphical code.

In some embodiments, the first lens may be substantially identical to the second lens. Alternatively, or in addition, the first lens and the second lens may be fixed in position. The first region and the second region may correspond to distinct partitions of the image sensor.

Another exemplary embodiment of a graphical code reader includes a first image sensor and a second image sensor. A first lens is provided for focusing a first image of a graphical code onto the first image sensor at a first magnification. The first image comprises a first field of view. A second lens is provided for focusing a second image of the graphical code onto the second image sensor at a second magnification. The second image comprises a second field of view. The first magnification is greater than the second magnification, and the first field of view is smaller than the second field of view. The graphical code reader includes a decoder for processing image data to obtain information contained in the graphical code.

In some embodiments, the first lens is substantially identical to the second lens. Alternatively, or in addition, the first lens and the second lens may be fixed in position.

Various embodiments of the invention are now described with reference to the Figures, where like reference numbers indicate identical or functionally similar elements. It will be readily understood that the components of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

FIG. 1 is a block diagram illustrating a graphical code 102 being read by a graphical code reader 104. As previously discussed, a graphical code 102 is a graphical representation of information. Examples of different types of graphical codes 102 include bar codes, data matrix codes, MaxiCodes, and so forth. Graphical codes 102 are typically read by a graphical code reader 104 in order to obtain the information contained in the graphical code 102.

Information is encoded into a graphical code 102 through the use of one or more graphical code elements 106. Different types of graphical codes 102 include different types of graphical code elements 106. For example, bar codes include variable-width rectangular bars. Data matrix codes include square data modules. MaxiCodes include a central finder pattern and a grid of hexagons surrounding the central finder pattern.

Different types of graphical codes 102 may vary in size. For example, bar codes are typically larger in size than data matrix codes. In addition, the graphical code elements 106 within different types of graphical codes 102 may also vary in size. For example, the variable-width rectangular bars in bar codes are typically larger than the square data modules in data matrix codes or the hexagons in MaxiCodes.

Figure 2:
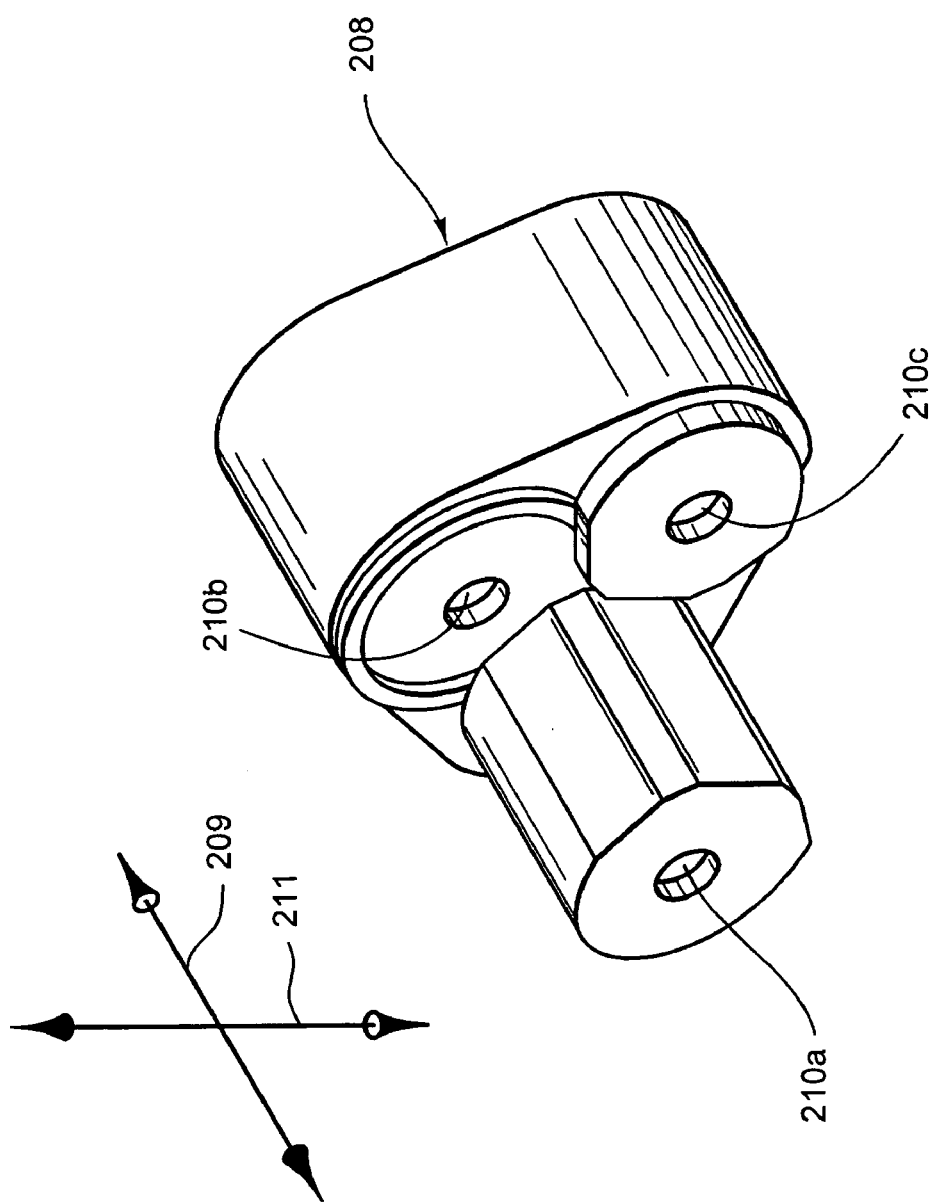
FIG. 2 is a perspective view of an embodiment of a lens piece which may be used in a graphical code reader.

The graphical code reader 104 includes a variety of different components which enable the graphical code reader 104 to obtain information from the graphical code 102. One component which is typically included in a graphical code reader 104 is a lens piece 208. FIG. 2 is a perspective view of an embodiment of a lens piece 208 which may be used in a graphical code reader 104. For reference purposes, a horizontal direction 209 and a vertical direction 211 are provided.

A plurality of lenses 210 are positioned inside the lens piece 208. More specifically, a first lens 210a, a second lens 210b, and a third lens 210c are positioned inside the lens piece 208. The lenses 210 possess substantially identical optical properties (e.g., focal length, principal plane, etc.). In addition, the lenses 210 are fixed, that is, the lenses 210 do not move within the lens piece 208.

The lenses 210 are positioned at different locations within the lens piece 208. The first lens 210a is located in front of the second lens 210b and the third lens 210c in the horizontal direction 209. The second lens 210b is located behind the first lens 210a and the third lens 210c in the horizontal direction 209. The third lens 210c is located between the first lens 210a and the second lens 210b in the horizontal direction 209.

When the lens piece 208 is placed inside the reader 104, the first lens 210a is located closest to the graphical code 102 and farthest away from the image sensor relative to the other lenses 210. In this position, the first lens 210a projects the elements 106 of the graphical code 102 onto the image sensor at a sufficiently high magnification so that a relatively high resolution image is formed. In other words, in the image that the first lens 210a projects onto the image sensor, even relatively small graphical code elements 106 are substantially distinct from one another. Thus, the image formed by the first lens 210a may be used to decode relatively small, high-density graphical codes 102.

Conversely, when the lens piece 208 is placed inside the reader 104, the second lens 210b is located closest to the image sensor and farthest away from the graphical code 102 relative to the other lenses 210. In this position, the second lens 210b projects the elements 106 of the graphical code 102 onto the image sensor at a lower magnification than the first lens 210a. Thus, the resolution of the image formed by the second lens 210b is not as high as the resolution of the image formed by the first lens 210a. Consequently, in the image that the second lens 210b projects onto the image sensor, some relatively small graphical code elements 106 may not be substantially distinct from one another. Accordingly, the image formed by the second lens 210b is typically not well-suited for decoding relatively small, high-density graphical codes 102.

As discussed above, the third lens 210c is located between the first lens 210a and the second lens 210b. In this position, the third lens 210c projects the elements 106 of the graphical code 102 onto the image sensor at a magnification that is lower than the first lens 210a but higher than the second lens 210b. Thus, the resolution of the image formed by the third lens 210c is higher than the resolution of the image formed by the second lens 210b, but not as high as the resolution of the image formed by the first lens 210a.

Figure 3:
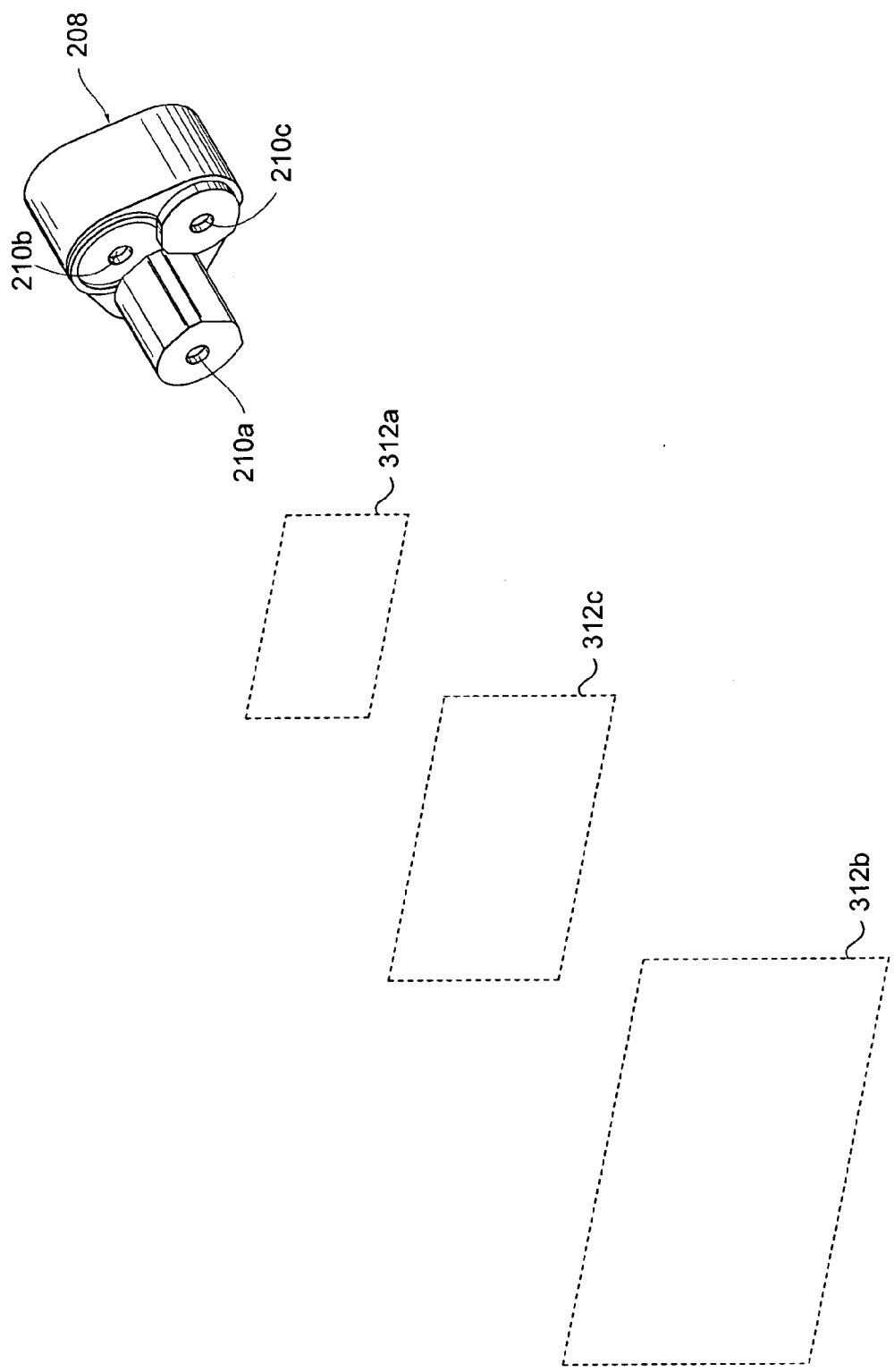
FIG. 3 illustrates the different fields of view of the lenses in the lens piece of FIG. 2.

For an image sensor of given size, there is a tradeoff between resolution and field of view. Increasing the resolution of an image formed on the image sensor decreases the field of view of the image, and vice versa. FIG. 3 illustrates the relative fields of view 312 of the images formed by the lenses 210 in the lens piece 208.

As shown, the image formed by the second lens 210b has a relatively large field of view 312b. Consequently, most graphical codes 102 are within the field of view 312b of the image formed by the second lens 210b, even relatively large graphical codes 102. In contrast, the image formed by the first lens 210a has a relatively small field of view 312a. Consequently, relatively large graphical codes 102 may not be completely within the field of view 312a of the image formed by the first lens 210a. The image formed by the third lens 210c has a field of view 312c that is larger than the field of view 312a of the image formed by the first lens 210a and smaller than the field of view 312b of the image formed by the second lens 210b.

Figure 4:
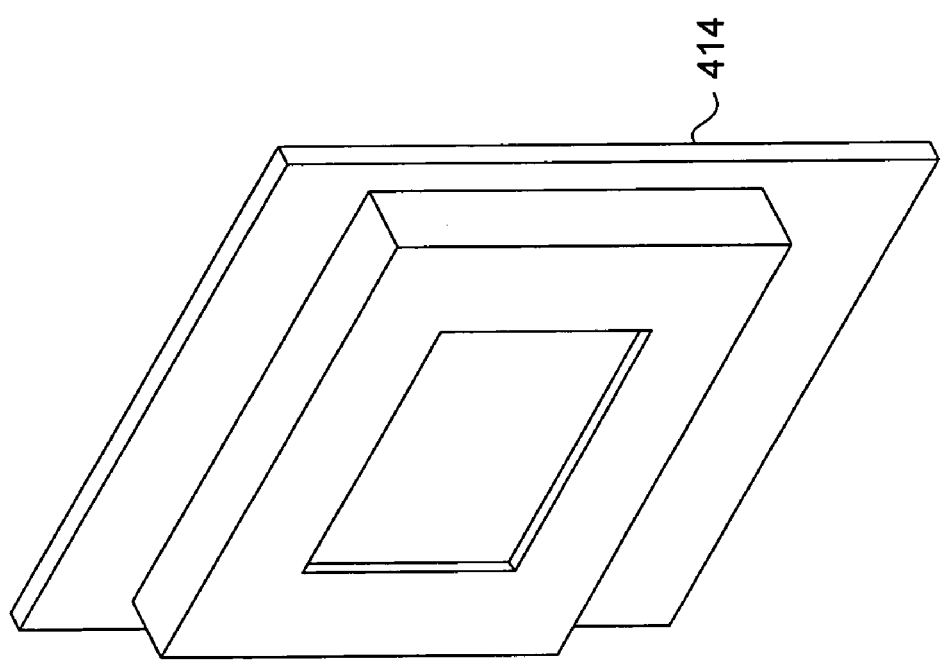
FIG. 4 is a perspective view of an image sensor.

As discussed previously, when the graphical code reader 104 is used to read a graphical code 102, each lens 210 in the lens piece 208 focuses an image of the graphical code 102 onto an image sensor 414. FIG. 4 is a perspective view of an embodiment of an image sensor 414. The image sensor 414 is a solid state photodetecting device containing a relatively large number of light-sensitive pixels that are arranged in horizontal rows and vertical columns. The pixels are read electronically to provide a two-dimensional array of pixel information corresponding to the graphical code 102. Different types of image sensors 414 are known to those skilled in the art, including CCD devices, CMOS devices, etc.

In some embodiments, the graphical code reader 104 includes more than one image sensor 414, and each lens 210 in the lens piece 208 focuses an image of the graphical code 102 onto a separate image sensor 414. In other embodiments, the graphical code reader 104 includes a single image sensor 414 that is partitioned into more than one region, and each lens 210 in the lens piece 208 focuses an image of the graphical code 102 onto a separate region within the partitioned image sensor 414.

Figure 5:
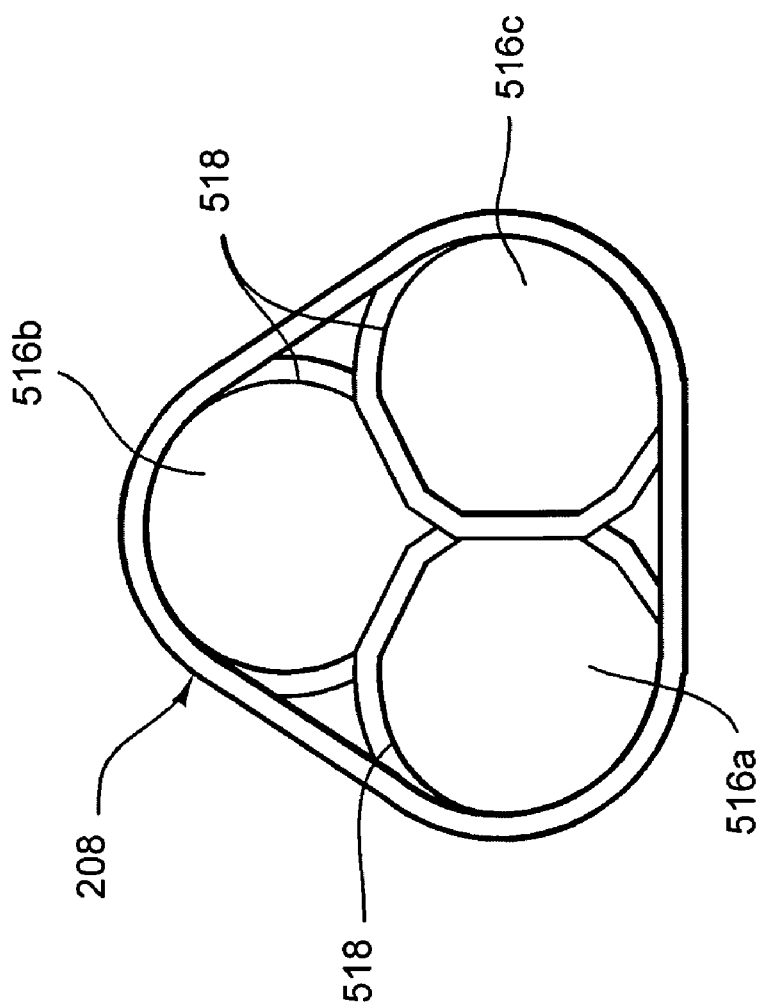
FIG. 5 is a cross-sectional view of the lens piece of FIG. 2.

FIG. 5 is a cross-sectional view of the lens piece 208. The lens piece 208 includes a first optical path 516a between the first lens 210a and a first image sensor 414 (or a first region of an image sensor 414), a second optical path 516b between the second lens 210b and a second image sensor 414 (or a second region of an image sensor 414), and a third optical path 516c between the third lens 210c and a third image sensor 414 (or a third region of an image sensor 414). One or more baffles 518 surround each optical path 516. The baffles 518 prevent light in one optical path 516 from spilling over into another optical path 516.

Figure 6:
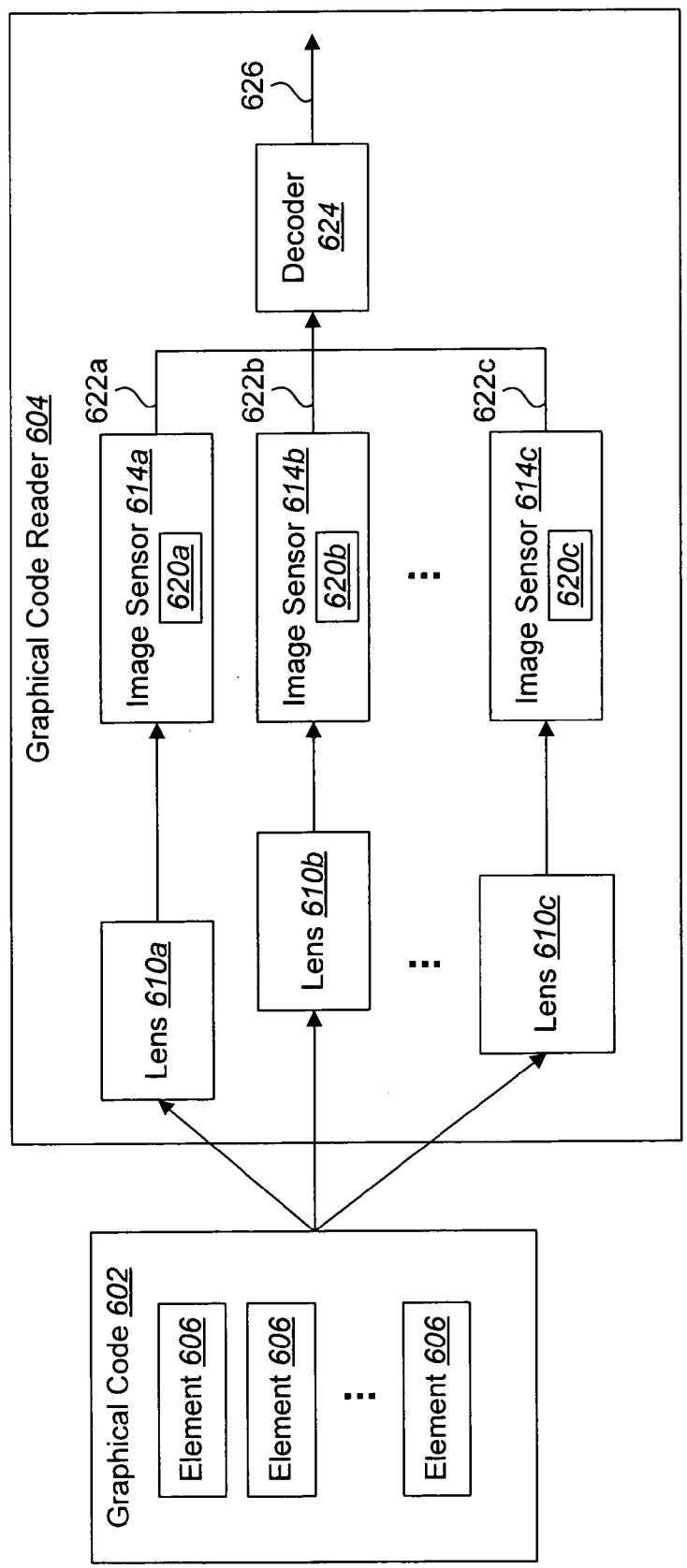
FIG. 6 is a block diagram illustrating functional components of a graphical code reader.

FIG. 6 is a block diagram illustrating functional components of a graphical code reader 604. The graphical code reader 604 includes one or more light sources (not shown) which illuminate a graphical code 602. Light is then reflected from the graphical code 602 toward the graphical code reader 604.

The graphical code reader 604 includes a first lens 610a, a second lens 610b, and a third lens 610c. The graphical code reader 604 also includes a first image sensor 614a, a second image sensor 614b, and a third image sensor 614c. A relatively large distance separates the first lens 610a and the first image sensor 614a, while a relatively small distance separates the second lens 610b and the second image sensor 614b. Conversely, a relatively small distance separates the first lens 610a and the graphical code 602, while a relatively large distance separates the second lens 610b and the graphical code 602. The third lens 610c is positioned between the first lens 610a and the second lens 610b, as discussed above.

The first lens 610a projects the elements 606 of the graphical code 602 onto the first image sensor 614a at a relatively high magnification. Consequently, a relatively high resolution image 620a is formed on the first image sensor 614a. The elements 606 of the graphical code 602 are typically distinct from one another in the high-resolution image 620a, even if the graphical code elements 606 are relatively small. However, at this resolution, relatively large graphical codes 602 may not be completely within the field of view 312a of the high resolution image 620a. Consequently, the entire graphical code 602 may not be completely contained within the high-resolution image 620a.

The second lens 610b projects the elements 606 of the graphical code 602 onto the second image sensor 614b at a relatively low magnification. Consequently, a relatively low-resolution image 620b is formed on the second image sensor 614b. If the graphical code elements 606 are relatively small, they may not be distinct from one another in the low-resolution image 620b. However, at this resolution, even relatively large graphical codes 602 are typically within the field of view 312b of the low-resolution image 620b. Consequently, the low-resolution image 620b typically includes the entire graphical code 602.

The third lens 610c projects the elements 606 of the graphical code 602 onto the third image sensor 614c at a magnification that is lower than the first lens 610a but higher than the second lens 610b. Consequently, an intermediate-resolution image 620c is formed on the third image sensor 614c. Some graphical code elements 606 that are not distinct from one another in the low-resolution image 620b may be distinct from one another in the intermediate-resolution image 620c, while some graphical code elements 606 that are distinct from one another in the high-resolution image 620a may not be distinct from one another in the intermediate-resolution image 620c. On the other hand, some graphical codes 602 that are not completely contained within the high-resolution image 620a may be completely contained within the intermediate-resolution image 620c. Conversely, some graphical codes 602 that are completely contained within the low-resolution image 620b may not be completely contained within the intermediate-resolution image 620c.

As will be described in greater detail below, in some embodiments the graphical code reader 604 may include only two lenses 610. In other embodiments, more than three lenses 610 may be included in the graphical code reader 604.

The pixels in the first image sensor 614a are read electronically to provide a two-dimensional array of high-resolution image data 622a corresponding to the high-resolution image 620a. The pixels in the second image sensor 614b are read electronically to provide a two-dimensional array of low-resolution image data 622b corresponding to the low-resolution image 620b. The pixels in the third image sensor 614c are read electronically to provide a two-dimensional array of intermediate-resolution image data 622c corresponding to the intermediate-resolution image 620c.

The high-resolution image data 622a, low-resolution image data 622b, and intermediate-resolution image data 622c are then provided to the decoder 624. The decoder 624 processes the image data 622 and extracts the information 626 contained in the graphical code 102. This information 626 is then provided to a software application. The software application may be stored locally on the graphical code reader 604. Alternatively, the software application may be stored on a computing device that is in electronic communication with the graphical code reader 604.

In some embodiments, only some of the image data 622 is processed. For example, if a relatively small graphical code 602 with relatively small graphical code elements 606 is being read by the graphical code reader 604, the decoder 624 may only process the high-resolution image data 622a. Alternatively, if a relatively large graphical code 602 with relatively large graphical code elements 606 is being read by the graphical code reader 604, the decoder 624 may only process the low-resolution image data 622b. The graphical code reader 604 may allow a user to select which image data 622 is processed by the decoder 624.

In other embodiments, all of the image data 622 is processed by the decoder 624. In such embodiments, the high-resolution image data 622a, low-resolution image data 622b, and intermediate-resolution image data 622c may be processed simultaneously or sequentially. The decoder 624 may be configured to detect redundant image data 622, i.e., image data 622 from different image sensors 614 that corresponds to the same portion of the graphical code 602. This redundant image data 622 may be suppressed from further processing. Detection of the redundant image data 622 may be based on the content of the image data 622 and the location of the graphical code 602 relative to a known target point. For example, if identical image data 622 (i.e., image data 622 having the same content or substantially the same content) is obtained from two different images 620 and both images 620 are in substantially the same location relative to a known target point, then the image data 622 obtained from one of the images 620 may be discarded.

Figure 7:
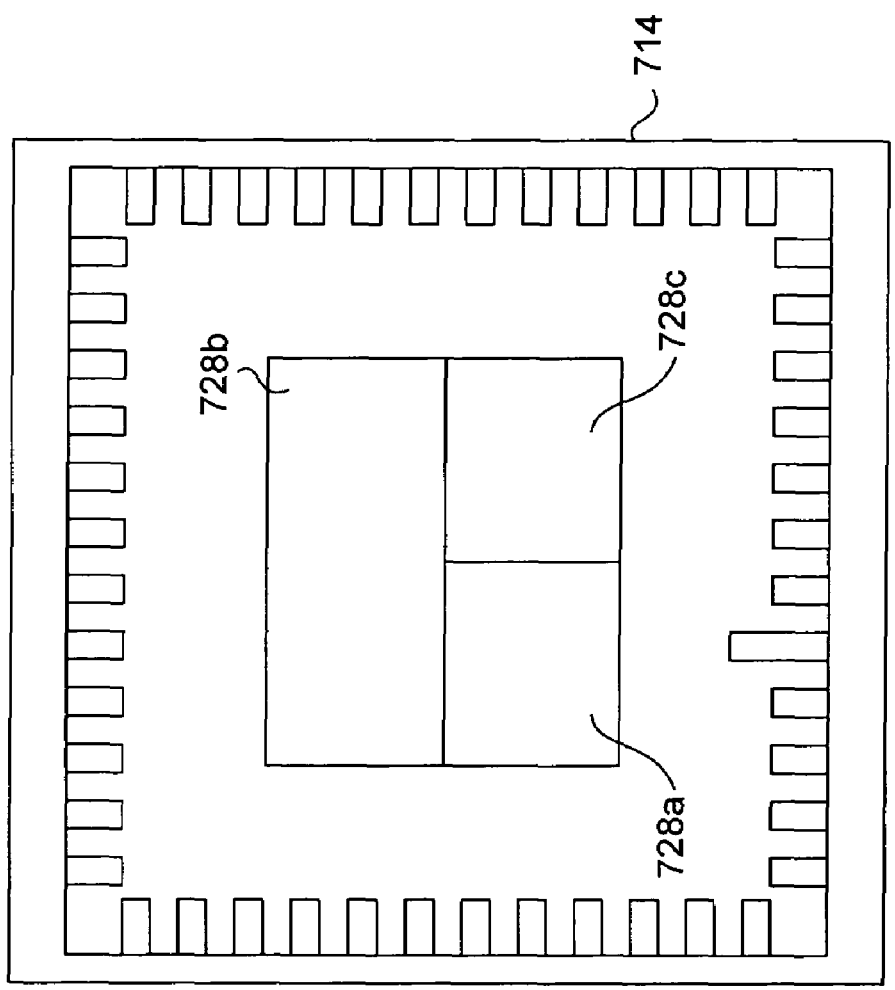
FIG. 7 is a side plan view of a partitioned image sensor.

In FIG. 6, each lens 610 projects an image 620 of the graphical code 602 onto a separate image sensor 614. In other embodiments, however, the graphical code reader includes a single image sensor that is partitioned into more than one region. FIG. 7 is a side plan view of a partitioned image sensor 714. The image sensor 714 is partitioned into a narrow-field region 728a, a wide-field region 728b, and an intermediate-field region 728c. The number of regions 728 typically corresponds to the number of lenses 210 in the graphical code reader 104.

Figure 8:
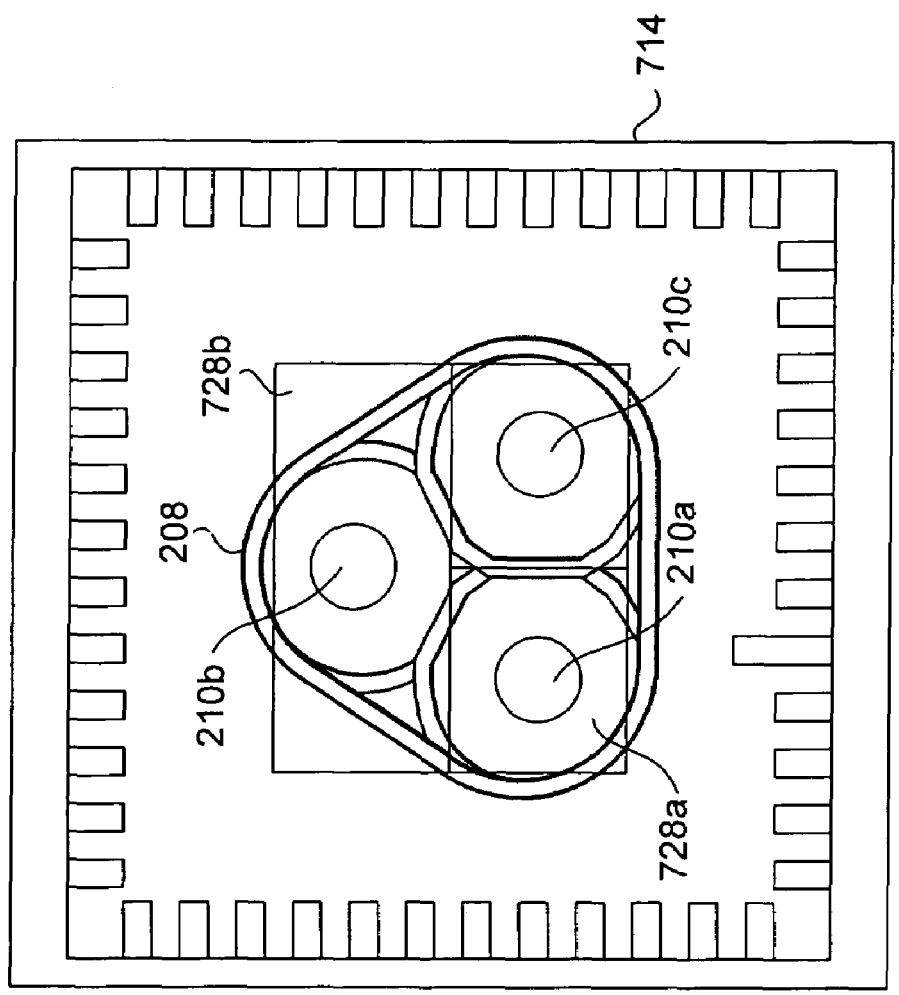
FIG. 8 is a side plan view of the lens piece of FIG. 2 positioned in front of the partitioned image sensor.

FIG. 8 is a side plan view of the lens piece 208 shown in FIG. 2 positioned in front of the partitioned image sensor 714. Each lens 210 in the lens piece 208 is positioned so as to focus light onto a region 728 of the partitioned image sensor 714. The first lens 210a is positioned so as to focus light onto the narrow-field region 728a of the partitioned image sensor 714. The second lens 210b is positioned so as to focus light onto the wide-field region 728b of the partitioned image sensor 714. The third lens 210c is positioned so as to focus light onto the intermediate-field region 728c of the partitioned image sensor 714.

Figure 9:
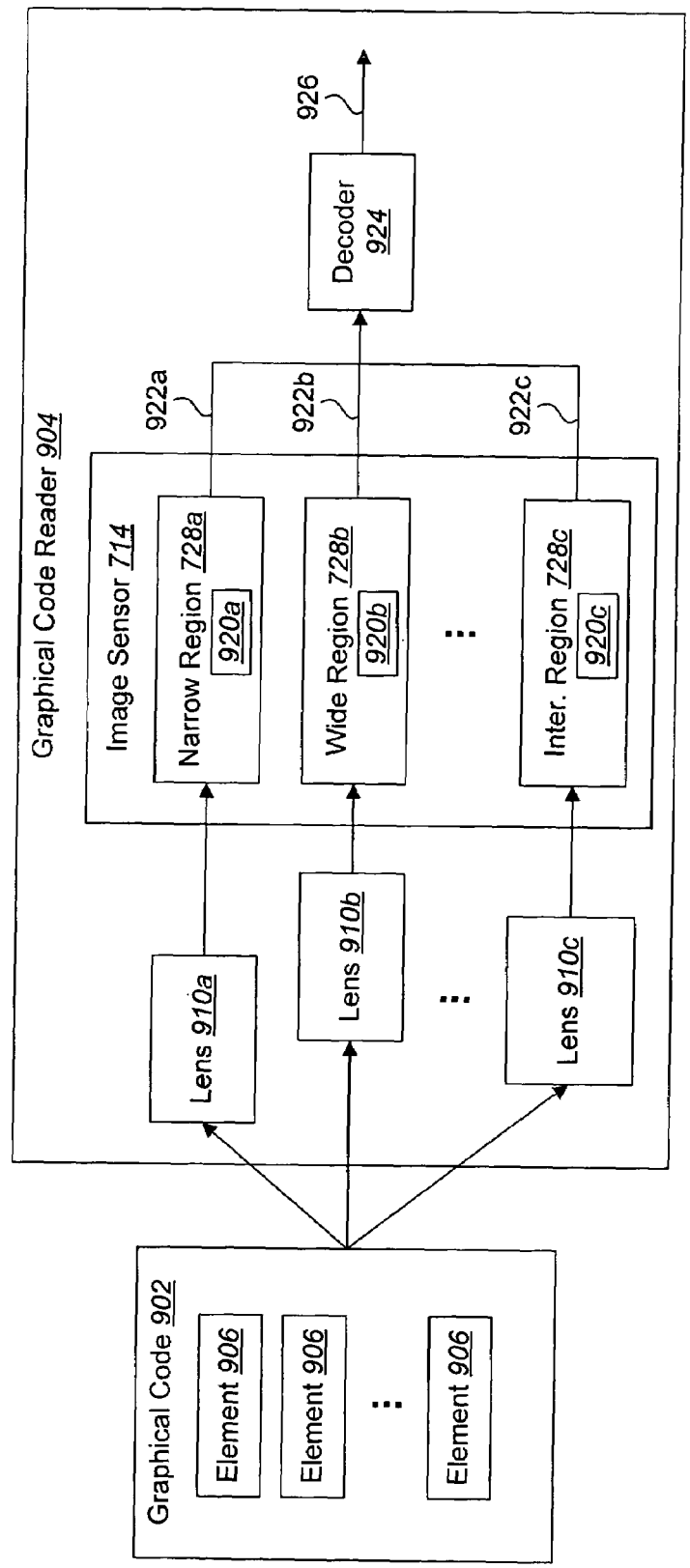
FIG. 9 is a block diagram illustrating functional components of an alternative embodiment of a graphical code reader.

FIG. 9 is a block diagram illustrating functional components of an embodiment of a graphical code reader 904 that includes the partitioned image sensor 714. As before, the graphical code reader 904 includes one or more light sources (not shown) which illuminate the graphical code 902. Light is then reflected from the graphical code 902 toward the graphical code reader 904.

The first lens 910a projects the elements 906 of the graphical code 902 onto the narrow-field region 728a of the partitioned image sensor 714 at a relatively high magnification, thereby forming a relatively high resolution image 920a. The second lens 910b projects the elements 906 of the graphical code 902 onto the wide-field region 728b of the partitioned image sensor 714 at a relatively low magnification, thereby forming a relatively low resolution image 920b. The third lens 910c projects the elements 906 of the graphical code 902 onto the intermediate-field region 728c of the partitioned image sensor 714 at a magnification that is greater than the second lens 910b but less than the first lens 910a, thereby forming an intermediate resolution image 920c.

The pixels in the narrow-field region 728a of the partitioned image sensor 714 are read electronically to provide a two-dimensional array of high-resolution image data 922a corresponding to the high-resolution image 920a. The pixels in the wide-field region 728b of the partitioned image sensor 714 are read electronically to provide a two-dimensional array of low-resolution image data 922b corresponding to the low-resolution image 920b. The pixels in the intermediate-field region 728c of the partitioned image sensor 714 are read electronically to provide a two-dimensional array of intermediate-resolution image data 922c corresponding to the intermediate-resolution image 920c. The high-resolution image data 922a, low-resolution image data 922b, and intermediate-resolution image data 922c are then provided to the decoder 924 and processed as described above.

Figure 10:
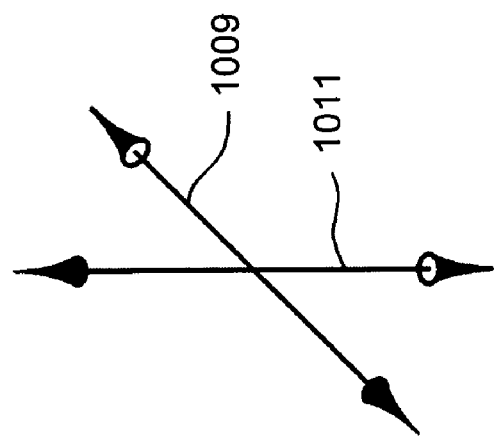
FIG. 10 is a perspective view of an alternative embodiment of a lens piece.
Figure 10:
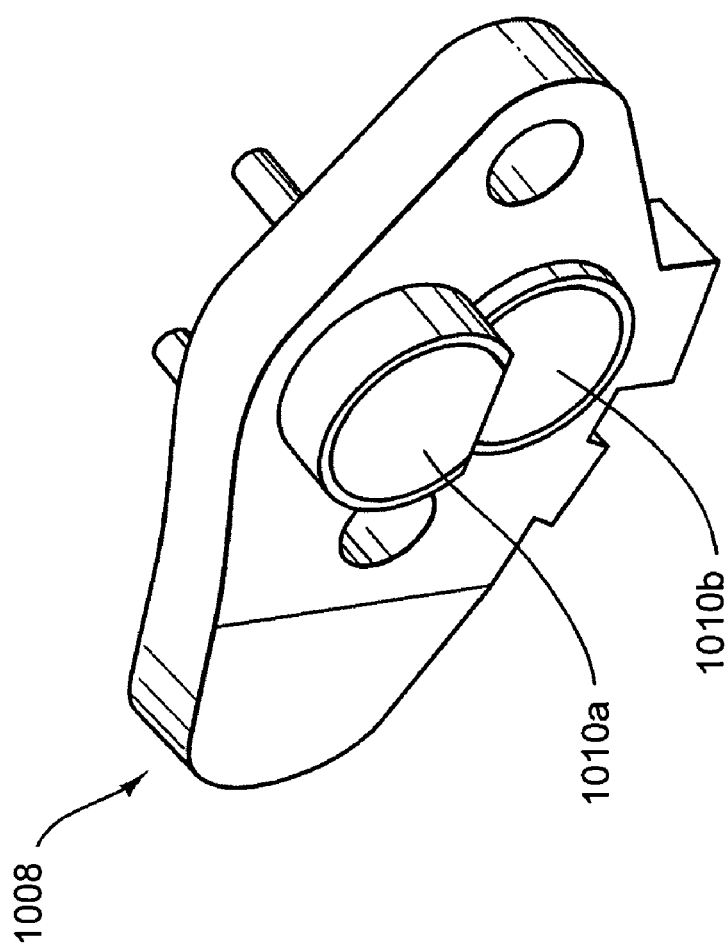

FIG. 10 is a perspective view of an alternative embodiment of a lens piece 1008 for use in a graphical code reader. A first lens 1010a and a second lens 1010b are positioned inside the lens piece 1008. As before, the lenses 1010 possess substantially identical optical properties (e.g., focal length, principal plane, etc.) and are fixed in position. In addition, the lenses 1010 are positioned at different locations within the lens piece 1008. Specifically, the first lens 1010a is located in front of the second lens 1010b in the horizontal direction 1009.

When the lens piece 1008 is placed inside the reader, the first lens 1010a is located closer to the graphical code and farther away from the image sensor than the second lens 1010b. In this position, the first lens 1010a focuses an image of the graphical code onto the image sensor at a higher magnification than the second lens 1010b. Thus, the image formed by the first lens 1010a has a higher resolution but a smaller field of view than the image formed by the second lens 1010b.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A graphical code reader, comprising:
   an image sensor;
   a first lens for focusing light reflected from a graphical code to form a first image on a first region of the image sensor at a first magnification, wherein the first lens is separated from the first region of the image sensor by a first distance;
   a second lens for focusing light reflected from the graphical code to form a second image on a second region of the image sensor at a second magnification, wherein the second lens is separated from the second region of the image sensor by a second distance, and wherein the first distance is greater than the second distance and the first magnification is greater than the second magnification; and
   a decoder for processing image data to obtain information contained in the graphical code.

2. The graphical code reader as defined in claim 1, wherein the first lens is substantially identical to the second lens.

3. The graphical code reader as defined in claim 2, wherein the first lens and the second lens are fixed in position.

4. The graphical code reader as defined in claim 2, wherein the image data corresponds to either the first image or the second image.

5. The graphical code reader as defined in claim 2, wherein the image data corresponds to both the first image and the second image, and wherein the decoder is configured to detect and suppress redundant image data.

6. The graphical code reader as defined in claim 2, wherein a first area between the first lens and the first region of the image sensor defines a first optical path, wherein a second area between the second lens and the second region of the image sensor defines a second optical path, and further comprising at least one baffle for preventing light in the first optical path from entering the second optical path and for preventing light in the second optical path from entering the first optical path.

7. The graphical code reader as defined in claim 2, further comprising a third lens for focusing light reflected from the graphical code to form a third image on a third region of the image sensor, wherein the third lens is separated from the third region of the image sensor by a third distance, and wherein the third distance is greater than the second distance but less than the first distance.

8. A graphical code reader, comprising:
   a first image sensor;
   a first lens for focusing light reflected from a graphical code to form a first image on the first image sensor at a first magnification, wherein the first lens is separated from the first image sensor by a first distance;
   a second image sensor;
   a second lens for focusing light reflected from the graphical code to form a second image on the second image sensor at a second magnification, wherein the second lens is separated from the second image sensor by a second distance, and wherein the first distance is greater than the second distance and the first magnification is greater than the second magnification; and
   a decoder for processing image data to obtain information contained in the graphical code.

9. The graphical code reader as defined in claim 8, wherein the first lens is substantially identical to the second lens.

10. The graphical code reader as defined in claim 9, wherein the first lens and the second lens are fixed in position.

11. The graphical code reader as defined in claim 9, wherein the image data corresponds to either the first image or the second image.

12. The graphical code reader as defined in claim 9, wherein the image data corresponds to both the first image and the second image, and wherein the decoder is configured to detect and suppress redundant image data.

13. The graphical code reader as defined in claim 9, wherein a first area between the first lens and the first image sensor defines a first optical path, wherein a second area between the second lens and the second image sensor defines a second optical path, and further comprising at least one baffle for preventing light in the first optical path from entering the second optical path and for preventing light in the second optical path from entering the first optical path.

14. The graphical code reader as defined in claim 9, further comprising:
   a third image sensor; and
   a third lens for focusing light reflected from the graphical code to form a third image on the third image sensor, wherein the third lens is separated from the image sensor by a third distance, and wherein the third distance is greater than the second distance but less than the first distance.

15. A graphical code reader, comprising:
an image sensor;
a first lens for focusing a first image of a graphical code onto a first region of the image sensor at a first magnification, wherein the first image comprises a first field of view;
a second lens for focusing a second image of the graphical code onto a second region of the image sensor at a second magnification, wherein the second image comprises a second field of view, wherein the first magnification is greater than the second magnification, and wherein the first field of view is smaller than the second field of view; and
a decoder for processing image data to obtain information contained in the graphical code.

16. The graphical code reader as defined in claim 15, wherein the first lens is substantially identical to the second lens.

17. The graphical code reader as defined in claim 15, wherein the first lens and the second lens are fixed in position.

18. The graphical code reader as defined in claim 15, wherein the first region and the second region correspond to distinct partitions of the image sensor.

19. A graphical code reader, comprising:
a first image sensor;
a first lens for focusing a first image of a graphical code onto the first image sensor at a first magnification, wherein the first image comprises a first field of view;
a second image sensor;
a second lens for focusing a second image of the graphical code onto the second image sensor at a second magnification, wherein the second image comprises a second field of view, wherein the first magnification is greater than the second magnification, and wherein the first field of view is smaller than the second field of view; and
a decoder for processing image data to obtain information contained in the graphical code.

20. The graphical code reader as defined in claim 19, wherein the first lens is substantially identical to the second lens.

21. The graphical code reader as defined in claim 19, wherein the first lens and the second lens are fixed in position.

* * * * *